United States Patent
Danson et al.

(10) Patent No.: US 11,336,770 B2
(45) Date of Patent: May 17, 2022

(54) SYSTEMS AND METHODS FOR ANALYZING COACHING COMMENTS

(71) Applicant: Mattersight Corporation, Chicago, IL (US)

(72) Inventors: Christopher Danson, Austin, TX (US); Douglas Brown, Austin, TX (US); Rachel Jean Stark, Berwyn, IL (US); Brittney Lynn McIngvale, Chicago, IL (US); Brendan Joyce, Chicago, IL (US)

(73) Assignee: MATTERSIGHT CORPORATION, Chicago, IL (US)

( * ) Notice: Subject to any disclaimer, the term of this patent is extended or adjusted under 35 U.S.C. 154(b) by 556 days.

(21) Appl. No.: 13/912,918

(22) Filed: Jun. 7, 2013

(65) Prior Publication Data

US 2014/0362984 A1 Dec. 11, 2014

(51) Int. Cl.
*H04M 3/51* (2006.01)

(52) U.S. Cl.
CPC .............. *H04M 3/5175* (2013.01)

(58) Field of Classification Search
CPC ......... G06F 17/30864; G06F 17/30663; G06F 17/30616; G06F 16/2264; G06F 16/2455; G06F 16/248; G06F 16/283; G06F 16/9535; G06F 16/176; G06F 16/24578; G06F 16/244; G06F 16/24575; G06F 16/287; G06F 16/335; G06F 16/78; G06F 16/3329; G06F 16/338; G06F 16/44; G06F 16/90332; G06Q 30/0283; G06Q 30/02; H04M 3/5175

USPC ........................................................ 707/750
See application file for complete search history.

(56) References Cited

U.S. PATENT DOCUMENTS

| | | | | |
|---|---|---|---|---|
| 4,828,257 A | * | 5/1989 | Dyer | A63B 21/0052 482/5 |
| 6,721,416 B1 | * | 4/2004 | Farrell | H04M 3/51 379/13 |
| 6,754,874 B1 | * | 6/2004 | Richman | G06Q 10/10 715/205 |
| 6,853,975 B1 | * | 2/2005 | Dirksen | G06Q 10/10 434/107 |
| 7,187,790 B2 | * | 3/2007 | Sabol | G16H 30/20 382/128 |
| 7,739,115 B1 | * | 6/2010 | Pettay | G10L 25/51 379/265.06 |
| 7,894,849 B2 | | 2/2011 | Kass et al. | |
| 7,940,897 B2 | | 5/2011 | Khor et al. | |
| 7,966,187 B1 | * | 6/2011 | Pettay | G10L 15/26 704/270.1 |
| 8,204,884 B2 | * | 6/2012 | Freedman | G06Q 30/06 379/265.06 |

(Continued)

FOREIGN PATENT DOCUMENTS

WO WO 2011/127592 A1 10/2011

*Primary Examiner* — Pierre M Vital
*Assistant Examiner* — Andalib F Lodhi
(74) *Attorney, Agent, or Firm* — Haynes and Boone, LLP

(57) ABSTRACT

The methods, apparatuses, and systems described herein are designed to analyze comments provided by a coach relating to an agent's interaction with a customer. The methods include receiving a coaching comment regarding an agent's interaction with a customer, applying at least one scoring algorithm to the comment, and outputting a score of the scoring algorithm.

27 Claims, 4 Drawing Sheets

(56) References Cited

U.S. PATENT DOCUMENTS

| | | |
|---|---|---|
| 8,370,155 B2 | 2/2013 | Byrd et al. |
| 8,526,597 B2 | 9/2013 | Geva et al. |
| 8,600,034 B2 | 12/2013 | Teitelman et al. |
| 8,768,752 B1* | 7/2014 | Buckelew ........ G06Q 10/06398 |
| | | 705/7.42 |
| 2001/0014143 A1 | 8/2001 | Kuhn |
| 2001/0043697 A1 | 11/2001 | Cox et al. |
| 2002/0087385 A1* | 7/2002 | Vincent ................ G06Q 10/10 |
| | | 705/7.29 |
| 2003/0049596 A1* | 3/2003 | Uda ....................... A63B 69/00 |
| | | 434/362 |
| 2003/0154072 A1* | 8/2003 | Young et al. .................... 704/9 |
| 2003/0156706 A1* | 8/2003 | Koehler ................... G09B 5/00 |
| | | 379/265.05 |
| 2003/0179877 A1 | 9/2003 | Dezonno et al. |
| 2003/0187725 A1 | 10/2003 | Jotkowitz |
| 2004/0138944 A1* | 7/2004 | Whitacre ........ G06Q 10/06398 |
| | | 705/7.42 |
| 2004/0172323 A1* | 9/2004 | Stamm ............ G06Q 10/06393 |
| | | 705/7.32 |
| 2005/0043986 A1* | 2/2005 | McConnell ......... H04M 3/5232 |
| | | 379/265.02 |
| 2005/0114379 A1 | 5/2005 | Lee |
| 2005/0170326 A1 | 8/2005 | Koehler et al. |
| 2006/0256953 A1* | 11/2006 | Pulaski ............... H04M 3/5175 |
| | | 379/265.06 |
| 2006/0265090 A1 | 11/2006 | Conway et al. |
| 2007/0050238 A1* | 3/2007 | Carr ....................... G06Q 10/10 |
| 2007/0195945 A1* | 8/2007 | Korenblit ............... G06Q 10/06 |
| | | 379/265.06 |
| 2007/0198330 A1 | 8/2007 | Korenblit et al. |
| 2008/0107255 A1 | 5/2008 | Geva et al. |
| 2008/0152121 A1* | 6/2008 | Mandalia ................ H04M 3/51 |
| | | 379/265.01 |
| 2008/0167952 A1 | 7/2008 | Blair |
| 2008/0181389 A1 | 7/2008 | Bourne et al. |
| 2009/0103708 A1 | 4/2009 | Conway et al. |
| 2009/0103709 A1* | 4/2009 | Conway ............ H04M 3/42221 |
| | | 379/265.09 |
| 2009/0222313 A1* | 9/2009 | Kannan .................. G06Q 30/02 |
| | | 705/7.31 |
| 2010/0004947 A1* | 1/2010 | Nadeau ................. G06F 19/328 |
| | | 705/3 |
| 2010/0017402 A1* | 1/2010 | Fleming ................ G06Q 50/20 |
| | | 707/E17.005 |
| 2010/0114672 A1* | 5/2010 | Klaus ....................... G09B 7/00 |
| | | 705/7.14 |
| 2010/0125460 A1* | 5/2010 | Mellott .................... G10L 13/00 |
| | | 704/270.1 |
| 2010/0318410 A1 | 12/2010 | Lee |
| 2010/0332227 A1 | 12/2010 | Melamed et al. |
| 2011/0103572 A1 | 5/2011 | Blair |
| 2012/0115110 A1* | 5/2012 | Wade ........................ F41G 3/26 |
| | | 434/19 |
| 2012/0258438 A1 | 10/2012 | Cohen |
| 2013/0016115 A1* | 1/2013 | Minert .................... G06T 1/0021 |
| | | 345/589 |
| 2013/0110565 A1* | 5/2013 | Means, Jr ............ G06Q 10/063 |
| | | 705/7.11 |
| 2013/0204876 A1* | 8/2013 | Szucs ...................... G06F 16/94 |
| | | 707/738 |
| 2013/0282447 A1* | 10/2013 | Himanen ......... G06Q 10/06398 |
| | | 705/7.42 |
| 2015/0066940 A1* | 3/2015 | Fernandes et al. ........... 707/740 |
| 2016/0006872 A1* | 1/2016 | Hamlin ............... H04M 3/5175 |
| | | 379/265.06 |

\* cited by examiner

SYSTEMS AND METHODS FOR ANALYZING COACHING COMMENTS

TECHNICAL FIELD

The present disclosure generally relates to methods, apparatuses, and systems for analyzing coaching comments, and more particularly to scoring a coach's comments regarding a contact center agent's interaction with a customer.

BACKGROUND OF THE DISCLOSURE

It is known to utilize telephone call centers to facilitate the receipt, response and routing of incoming telephone calls relating to customer service, retention, and sales. Generally, a customer is in contact with a customer service representative ("CSR") or call center agent who is responsible for answering the customer's inquiries and/or directing the customer to the appropriate individual, department, information source, or service as required to satisfy the customer's needs.

It is also well known to monitor calls between a customer and a call center agent. Accordingly, call centers typically employ individuals responsible for listening to the conversation between the customer and the agent, and providing input on the conversation. While interactions between the customer and agent are scrutinized and evaluated, the feedback provided by the evaluator is not. Thus, the quality and effectiveness of this feedback is not known to be thoroughly analyzed. Thus, systems, apparatuses, and methods of evaluating comments provided to agents by coaches as in the present disclosure are needed.

SUMMARY

A customer calls, or otherwise communicates with a contact center. These communications are reviewed by, for example, contact center supervisors who are tasked with providing feedback to contact center agents to improve their performance. In various alternative embodiments, feedback is provided by peers of the agent and/or a quality assurance manager. The feedback comments are run through a scoring algorithm, e.g., a "customized" algorithm, "actionable" algorithm, and/or "encouragement" algorithm. The output of the algorithm indicates how each comment scores. In some embodiments, the scores for the coach are compared against other coaches in the contact center, or compared to a target score.

The systems, apparatus, and methods disclosed herein may be used to evaluate the effectiveness and value of coaching feedback. The present disclosure describes how to efficiently score and compare coaching comments.

In a first aspect, the invention encompasses a system for analyzing a coach's comments that includes a node comprising a processor and a computer readable medium operably coupled thereto, the computer readable medium comprising a plurality of instructions stored in association therewith that are accessible to, and executable by, the processor, where the plurality of instructions includes, instructions, that when executed, receive a coaching comment regarding an agent's interaction with a customer, instructions, that when executed, score the comment, and instructions, that when executed, output the score of the coach.

In a second aspect, the invention encompasses a method for analyzing a coach's comments, that includes receiving a coaching comment regarding an agent's interaction with a customer, applying at least one scoring algorithm to the comment, and outputting a score of the scoring algorithm.

In a third aspect, the invention encompasses a computer readable medium comprising a plurality of instructions that includes instructions, that when executed, receive a coaching comment regarding an agent's interaction with a customer, instructions, that when executed, score the comment using at least one scoring algorithm, instructions, that when executed, aggregate the scores for each comment of the coach, and instructions, that when executed, compare the aggregated score of the coach with a second aggregated score.

In a fourth aspect, the invention encompasses an apparatus for analyzing a coaching comments, which includes a database module adapted to receive a plurality of coaching comments, each regarding an agent's interaction with a customer, a scoring module adapted to score each coaching comment using at least one scoring algorithm, and a display module adapted to output the score of the coach.

In a fifth aspect, the invention encompasses methods of developing a coaching scoring algorithm including by providing a base algorithm created by linguistic analysis of coaching comments regarding contact center agent interaction with a customer, providing previously analyzed coaching comments to the base algorithm; and causing the base algorithm to identify usage patterns of terms and phrases in comments.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION OF THE PREFERRED EMBODIMENTS

Figure 1:
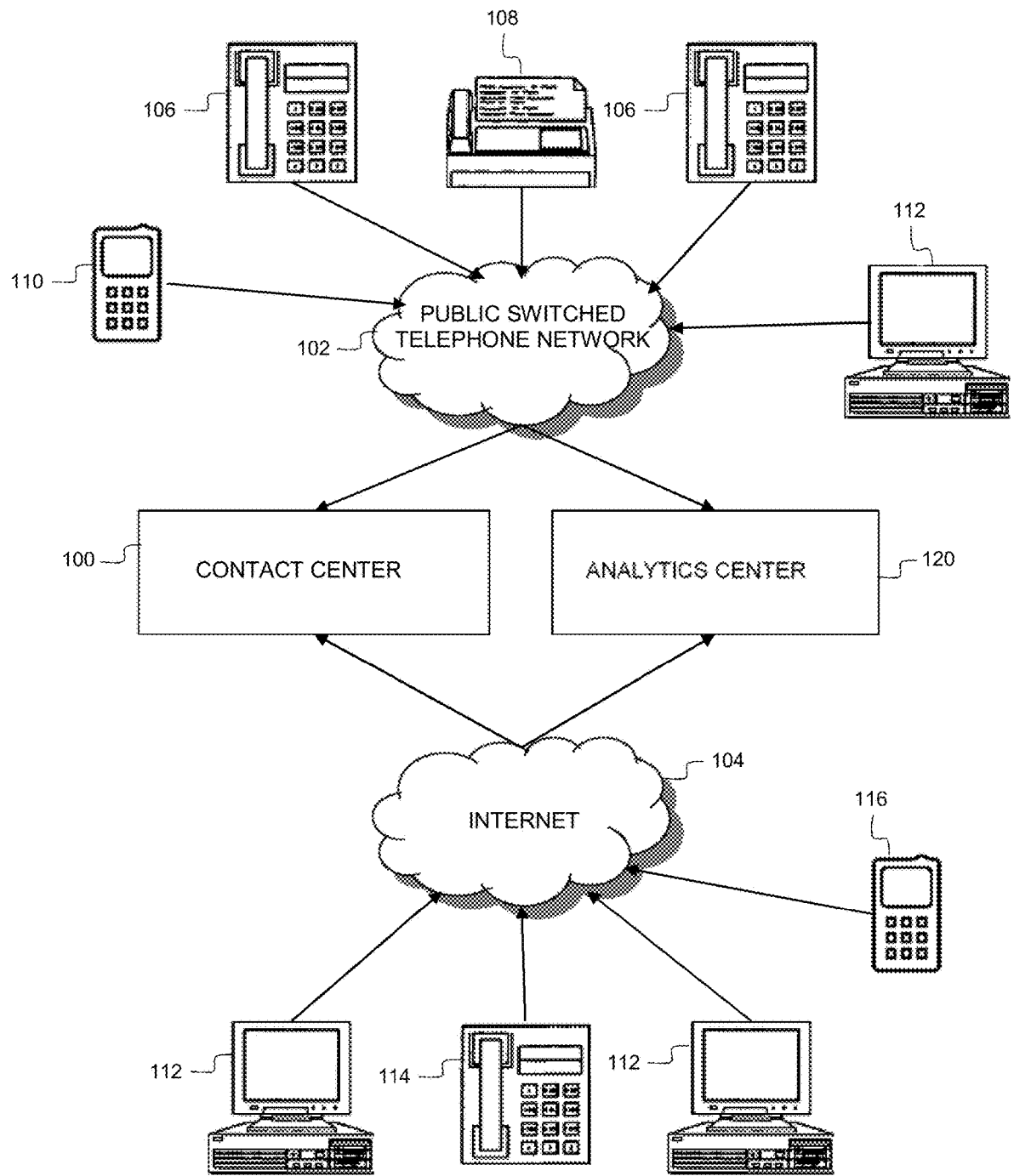
FIG. 1 is a simplified block diagram of an embodiment of a contact center according to various aspects of the present disclosure.

The present disclosure advantageously provides for methods of analyzing and evaluating coaching comments. These methods typically include receiving a coaching comment, applying at least one scoring algorithm to the comment, and outputting a score of the scoring algorithm. In particular, the methods described herein search for and identify text-based keywords relevant to determining the level of feedback on as to the "customized," "actionable," and/or "encouraging" comment. Determining the effectiveness of the comment can improve the performance of the coach, which in turn, can improve the performance of the agent. The term "comment" as used herein refers to a remark expressing an opinion or reaction, and may include one sentence or more than one sentence. A "comment" may also be expressed verbally or in writing (including in electronic form, e.g., a text message or email), or the like. "Coach(es)" are defined herein as any one of a supervisor, peer, quality assurance manager, or person who provides feedback to an agent.

Systems and apparatuses for carrying out these methods are also part of the present disclosure. An exemplary system to analyze coaching comments includes, for example, a node including a processor and a computer readable medium operably coupled thereto, the computer readable medium comprising a plurality of instructions stored in association therewith that are accessible to, and executable by, the processor, where the plurality of instructions includes instructions, that when executed, receive a coaching comment regarding an agent's interaction with a customer, instructions, that when executed, score the comment, and instructions, that when executed, output the score of the coach.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one of ordinary skill in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a simplified block diagram of an embodiment of a contact center 100 according to various aspects of the present disclosure. A "contact center" as used herein can include any facility or system server suitable for receiving and recording electronic communications from customers. Such customer communications can include, for example, telephone calls, facsimile transmissions, e-mails, web interactions, voice over IP ("VoIP") and video. Various specific types of communications contemplated through one or more of these channels include, without limitation, email, SMS data (e.g., text), tweet, instant message, web-form submission, smartphone app, social media data, and web content data (including but not limited to internet survey data, blog data, microblog data, discussion forum data, and chat data), etc. In some embodiments, the communications can include customer tasks, such as taking an order, making a sale, responding to a complaint, etc. In various aspects, real-time communication, such as voice, video, or both, is preferably included. It is contemplated that these communications may be transmitted by and through any type of telecommunication device and over any medium suitable for carrying data. For example, the communications may be transmitted by or through telephone lines, cable, or wireless communications. As shown in FIG. 1, the contact center 100 of the present disclosure is adapted to receive and record varying electronic communications and data formats that represent an interaction that may occur between a customer (or caller) and a contact center agent during fulfillment of a customer and agent transaction. In one embodiment, the contact center 100 records all of the customer calls in uncompressed audio formats. In the illustrated embodiment, customers may communicate with agents associated with the contact center 100 via multiple different communication networks such as a public switched telephone network (PSTN) 102 or the Internet 104. For example, a customer may initiate an interaction session through traditional telephones 106, a fax machine 108, a cellular (i.e., mobile) telephone 110, a personal computing device 112 with a modem, or other legacy communication device via the PSTN 102. Further, the contact center 100 may accept internet-based interaction sessions from personal computing devices 112, VoIP telephones 114, and internet-enabled smartphones 116 and personal digital assistants (PDAs).

Often, in contact center environments such as contact center 100, it is desirable to evaluate communications between an agent and a customer in a customer interaction, be it a telephone-based interaction, a web-based interaction, or other type of electronic interaction over the PSTN 102 or Internet 104. It is also often desirable to train agents to improve the quality of their interactions with agents. Thus, in some embodiments, the present disclosure provides a method for training the agent by analyzing communications between the agent and the customer, and a method for evaluating communications between the agent and his or her coach, e.g., supervisor.

As one of ordinary skill in the art would recognize, the illustrated example of communication channels associated with a contact center 100 in FIG. 1 is just an example, and the contact center may accept customer interactions, and other analyzed interaction information from an analytics center 120, through various additional and/or different devices and communication channels whether or not expressly described herein. In one embodiment, coaches are present at the contact center and monitoring the interactions of agents with customers. This monitoring can occur in real-time, in near real-time (e.g., a delay of about 1 second to about 10 minutes, preferably about 5 seconds to about 5 minutes, and in one embodiment within three minutes of a contact being completed), or at a later time.

In some embodiments, the coaches are off-site, for example, at an analytics center 120. Internet-based interactions and/or telephone-based interactions may be routed through an analytics center 120 before reaching the contact center 100 or may be routed simultaneously to the contact center and the analytics center (or even directly and only to the contact center). In some instances, the analytics center 120 is a third-party analytics company that captures multi-channel interaction data associated with the contact center 100 and applies analytics to the data to generate actionable intelligence for the contact center. Also, in some embodiments, internet-based interactions may be received and handled by a marketing department associated with either the contact center 100 or analytics center 120. The analytics center 120 may be controlled by the same entity or a different entity than the contact center 100. Further, the analytics center 120 may be a part of, or independent of, the contact center 100.

Figure 2:
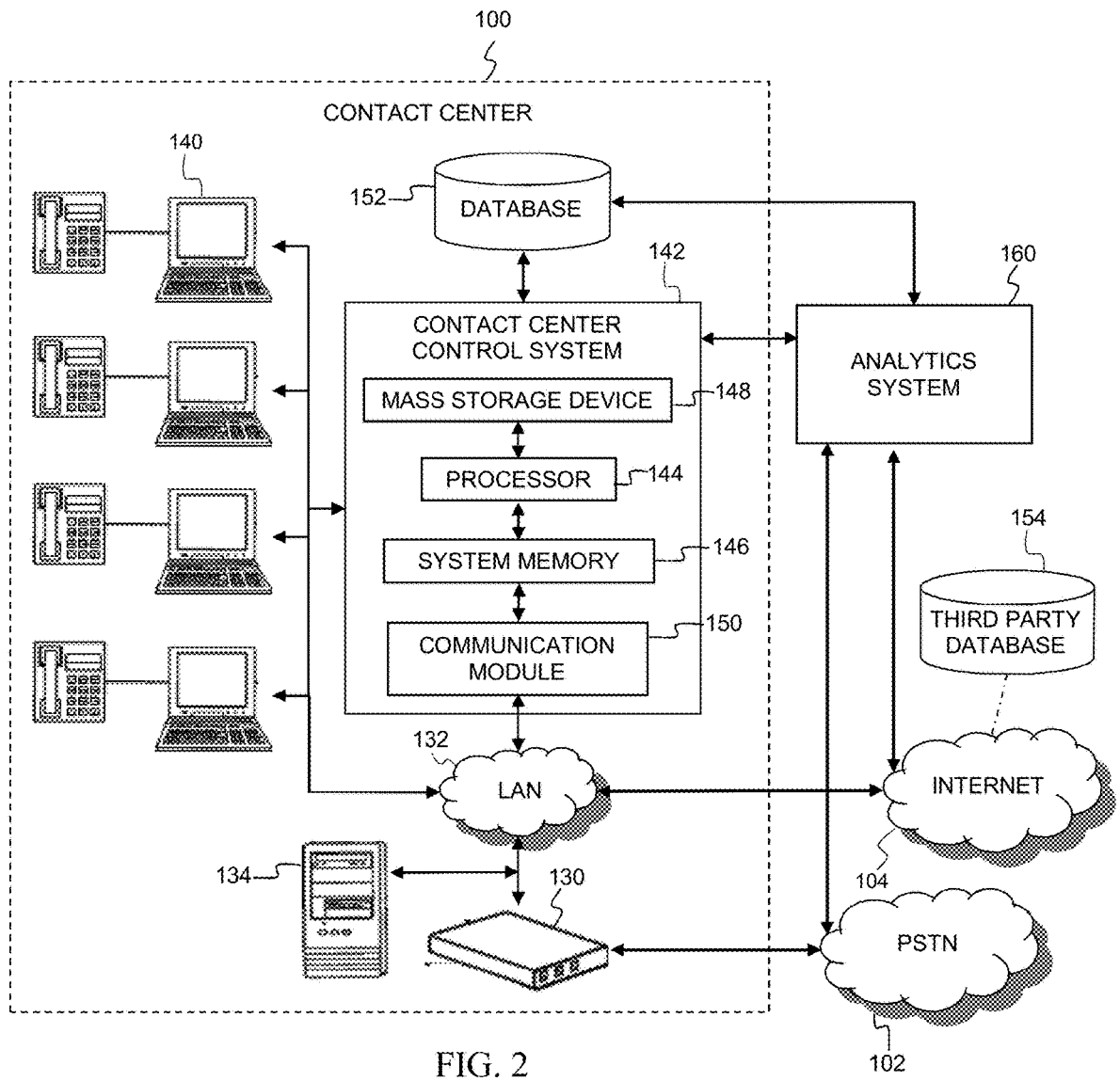
FIG. 2 is a more detailed block diagram of the contact center of FIG. 1 according to aspects of the present disclosure.

FIG. 2 is a more detailed block diagram of an embodiment of the contact center 100 according to aspects of the present disclosure. As shown in FIG. 2, the contact center 100 is communicatively coupled to the PSTN 102 via a distributed private branch exchange (PBX) switch 130. The PBX switch 130 provides an interface between the PSTN 102 and a local area network (LAN) 132 within the contact center 100. In general, the PBX switch 130 connects trunk and line station interfaces of the PSTN 102 to components communicatively coupled to the LAN 132. The PBX switch 130 may be implemented with hardware or virtually. A hardware-based PBX may be implemented in equipment located local to the user of the PBX system. In contrast, a virtual PBX may be implemented in equipment located at a central telephone service provider that delivers PBX functionality as a service over the PSTN 102. Additionally, in one embodiment, the PBX switch 130 may be controlled by software stored on a telephony server 134 coupled to the PBX switch. In another embodiment, the PBX switch 130 may be integrated within telephony server 134. The telephony server 134 incorporates PBX control software to control the initiation and termination of connections between telephones within the contact center 100 and outside trunk connections to the PSTN 102. In addition, the software may monitor the status of all telephone stations coupled to the LAN 132 and may be capable of responding to telephony events to provide traditional telephone service. In certain embodiments, this may include the control and generation of the conventional signaling tones including without limitation dial tones, busy tones, ring back tones, as well as the connection and termination of media streams between telephones on the LAN 132. Further, the PBX control software may programmatically implement standard PBX functions such as the initiation and termination of telephone calls, either across the network or to outside trunk lines, the ability to put calls on hold, to transfer, park and pick up calls, to conference multiple callers, and to provide caller ID information. Telephony applications such as voice mail and auto attendant may be implemented by application software using the PBX as a network telephony services provider.

In one embodiment, the telephony server 134 includes a trunk interface that utilizes conventional telephony trunk transmission supervision and signaling protocols required to interface with the outside trunk circuits from the PSTN 102. The trunk lines carry various types of telephony signals such as transmission supervision and signaling, audio, fax, or modem data to provide plain old telephone service (POTS). In addition, the trunk lines may carry other communication formats such T1, ISDN or fiber service to provide telephony or multimedia data images, video, text or audio.

The telephony server 134 includes hardware and software components to interface with the LAN 132 of the contact center 100. In one embodiment, the LAN 132 may utilize IP telephony, which integrates audio and video stream control with legacy telephony functions and may be supported through the H.323 protocol. H.323 is an International Telecommunication Union (ITU) telecommunications protocol that defines a standard for providing voice and video services over data networks. H.323 permits users to make point-to-point audio and video phone calls over a local area network. IP telephony systems can be integrated with the public telephone system through an IP/PBX-PSTN gateway, thereby allowing a user to place telephone calls from an enabled computer. For example, a call from an IP telephony client within the contact center 100 to a conventional telephone outside of the contact center would be routed via the LAN 132 to the IP/PBX-PSTN gateway. The IP/PBX-PSTN gateway would then translate the H.323 protocol to conventional telephone protocol and route the call over the PSTN 102 to its destination. Conversely, an incoming call from a customer over the PSTN 102 may be routed to the IP/PBX-PSTN gateway, which translates the conventional telephone protocol to H.323 protocol so that it may be routed to a VoIP-enable phone or computer within the contact center 100.

The contact center 100 can be further communicatively coupled to the Internet 104 via hardware and software components within the LAN 132. One of ordinary skill in the art would recognize that the LAN 132 and the connections between the contact center 100 and external networks such as the PSTN 102 and the Internet 104 as illustrated by FIG. 2 have been simplified for the sake of clarity and the contact center may include various additional and/or different software and hardware networking components such as routers, switches, gateways, network bridges, hubs, and legacy telephony equipment.

As shown in FIG. 2, the contact center 100 includes a plurality of agent workstations 140 that enable agents employed by the contact center 100 to engage in customer interactions over a plurality of communication channels. In one embodiment, each agent workstation 140 may include at least a telephone and a computer workstation. In other embodiments, each agent workstation 140 may include a computer workstation that provides both computing and telephony functionality. Through the workstations 140, the agents may engage in telephone conversations with the customer, respond to email inquiries, receive faxes, engage in instant message conversations, respond to website-based inquires, video chat with a customer, and otherwise participate in various customer interaction sessions across one or more channels. Further, in some embodiments, the agent workstations 140 may be remotely located from the contact center 100, for example, in another city, state, or country. Alternatively, in some embodiments, an agent may be a software-based application configured to interact in some manner with a customer. An exemplary software-based application as an agent is an online chat program designed to interpret customer inquiries and respond with pre-programmed answers.

In various embodiments, the contact center 100 includes one or more supervisor workstations (not shown), which receive data regarding customer/agent interactions. A supervisor's workstation is typically configured to include a computer, which has a data display device such as a monitor, flat panel display, etc. The workstation may also be configured with one or more data input devices such as a pointing device, a computer mouse, a touch pad, a keyboard, a voice activated interface including a microphone, local storage, etc. Typically, there are fewer supervisor workstations than agent workstations since it is generally not required to analyze every customer/agent interaction and typically there are fewer supervisors working than agents at any given time. It is, however, possible to employ a number of supervisors sufficient to analyze every interaction that is made by every agent with every customer, including having all supervisors at one site to supervise agent/customer interactions at multiple contact centers including remote centers or agents. In one embodiment, acceptable results are achieved with two to three supervisors monitoring 50-75 agents interacting with customers, or any similar ratio of approximately 1 supervisor to about 15-30 agents.

The contact center 100 further includes a contact center control system 142 that is generally configured to provide recording, voice analysis, behavioral analysis, storage, and other processing functionality to the contact center. In the illustrated embodiment, the contact center control system 142 is an information handling system such as a computer, server, workstation, mainframe computer, or other suitable computing device. In other embodiments, the control system 142 may be a plurality of communicatively coupled computing devices coordinated to provide the above functionality for the contact center 100. The control system 142 includes a processor 144 that is communicatively coupled to a system memory 146, a mass storage device 148, and a communication module 150. The processor 144 can be any custom made or commercially available processor, a central processing unit (CPU), an auxiliary processor among several processors associated with the control system 142, a semiconductor-based microprocessor (in the form of a microchip or chip set), a macroprocessor, a collection of communicatively coupled processors, or any device for executing software instructions. The system memory 146 provides the processor 144 with non-transitory, computer-readable storage to facilitate execution of computer instructions by the processor. Examples of system memory may include random access memory (RAM) devices such as dynamic RAM (DRAM), synchronous DRAM (SDRAM), solid state memory devices, and/or a variety of other memory devices known in the art. Computer programs, instructions, and data may be stored on the mass storage device 148. Examples of mass storage devices may include hard discs, optical disks, magneto-optical discs, solid-state storage devices, tape drives, CD-ROM drives, and/or a variety other mass storage devices known in the art. Further, the mass storage device may be implemented across one or more network-based storage systems, such as a storage area network (SAN). The communication module 150 is operable to receive and transmit contact center-related data between local and remote networked systems and communicate information such as customer interaction recordings between the other components coupled to the LAN 132. Examples of communication modules may include Ethernet cards, 802.11 WiFi devices, cellular data radios, and/or other suitable devices known in the art. The contact center control system 142 may further include any number of additional components, which are omitted for simplicity, such as input and/or output (I/O) devices (or peripherals), buses, dedicated graphics controllers, storage controllers, buffers (caches), and drivers. Further, functionality described in association with the control system 142 may be implemented in software (e.g., computer instructions), hardware (e.g., discrete logic circuits, application specific integrated circuit (ASIC) gates, programmable gate arrays, field programmable gate arrays (FPGAs), etc.), or a combination of hardware and software.

According to one aspect of the present disclosure, the contact center control system 142 is configured to record, collect, and analyze customer voice data and other structured and unstructured data, and other tools may be used in association therewith to increase efficiency and efficacy of the contact center. As an aspect of this, the control system 142 is operable to record unstructured interactions between customers and agents occurring over different communication channels including without limitation telephone conversations, email exchanges, website postings, social media communications, smartphone application (i.e., app) communications, fax messages, instant message conversations. For example, the control system 142 may include a hardware or software-based recording server to capture the audio of a standard or VoIP telephone connection established between an agent workstation 140 and an outside customer telephone system. Further, the audio from an unstructured telephone call or video conference session may be transcribed manually or automatically and stored in association with the original audio or video. In one embodiment, multiple communication channels (i.e., multi-channel) may be used according to the invention, either in real-time to collect information, for evaluation, or both. For example, control system 142 can receive, evaluate, and store telephone calls, emails, and fax messages. Thus, multi-channel can refer to multiple channels of interaction data, or analysis using two or more channels, depending on the context herein.

In addition to unstructured interaction data such as interaction transcriptions, the control system 142 is configured to captured structured data related to customers, agents, and their interactions. For example, in one embodiment, a "cradle-to-grave" recording may be used to record all information related to a particular telephone call from the time the call enters the contact center to the later of: the caller hanging up, or the agent completing the transaction. All or a portion of the interactions during the call may be recorded, including interaction with an interactive voice response (IVR) system, time spent on hold, data keyed through the caller's key pad, conversations with the agent, and screens displayed by the agent at his/her station during the transaction. Additionally, structured data associated with interactions with specific customers may be collected and associated with each customer, including without limitation the number and length of calls placed to the contact center, call origination information, reasons for interactions, outcome of interactions, average hold time, agent actions during interactions with customer(s), manager escalations during calls, types of social media interactions, number of distress events during interactions, survey results, and other interaction information. In addition to collecting interaction data associated with a customer, the control system 142 is also operable to collect biographical profile information specific to a customer including without limitation customer phone number, account/policy numbers, address, employment status, income, gender, race, age, education, nationality, ethnicity, marital status, credit score, customer "value" data (i.e., customer tenure, money spent as customer, etc.), personality type (as determined by past interactions), and other relevant customer identification and biological information. The control system 142 may also collect agent-specific unstructured and structured data including without limitation agent personality type, gender, language skills, performance data (e.g., customer retention rate, etc.), tenure and salary data, training level, average hold time during interactions, manager escalations, agent workstation utilization, and any other agent data relevant to contact center performance. Additionally, one of ordinary skill in the art would recognize that the types of data collected by the contact center control system 142 that are identified above are simply examples and additional and/or different or different combinations of interaction data, customer data, agent data, and telephony data may be collected and processed by the control system 142.

In certain embodiments, the control system 142 is further configured to process coaching comments provided to an agent. For example, control system 142 may be designed to receive the comments, apply at least one scoring algorithm to the comments, and output a score based on the words used in the comments. The score may be displayed and/or stored for later reference.

The control system 142 may store recorded and collected interaction data in a database 152, including customer data, agent data, and coach data. In certain embodiments, agent data, such as agent scores for dealing with customers, are updated daily. The database 152 may be any type of reliable storage solution such as a RAID-based storage server, an array of hard disks, a storage area network of interconnected storage devices, an array of tape drives, or some other scalable storage solution located either within the contact center or remotely located (i.e., in the cloud). Further, in other embodiments, the contact center control system 142 may have access not only to data collected within the contact center 100 but also data made available by external sources such as a third party database 154. In certain embodiments, the control system 142 may query the third party database for customer data such as credit reports, past transaction data, and other structured and unstructured data. In other embodiments, the control system 142 may access the third party database for keywords, phrases, and terms to be identified in coaching comments. For instance, the third party database may act as a library that stores information that is used by the scoring algorithm.

Additionally, in some embodiments, an analytics system 160 may also perform some or all of the functionality ascribed to the contact center control system 142 above. For instance, the analytics system 160 may record telephone and internet-based interactions, perform behavioral analyses, process and score coaching comments, and perform other contact center-related computing tasks. The analytics system 160 may be integrated into the contact center control system 142 as a hardware or software module and share its computing resources 144, 146, 148, and 150, or it may be a separate computing system housed, for example, in the analytics center 120 shown in FIG. 1. In the latter case, the analytics system 160 includes its own processor and non-transitory computer-readable storage medium (e.g., system memory, hard drive, etc.) on which to store analytics software and other software instructions.

The multi-channel interaction data collected in the context of the control center 100 may be subject to a linguistic-based psychological behavioral model to assess the personality of customers and agents associated with the interactions. For example, such a behavioral model may be applied to the transcription of a telephone call, instant message conversation, or email thread, between a customer and agent to gain insight into why a specific outcome resulted from the interaction.

In one embodiment, interaction data is mined for behavioral signifiers associated with a linguistic-based psychological behavioral model. In particular, the contact center control system 142 searches for and identifies text-based keywords (i.e., behavioral signifiers) relevant to a predetermined psychological behavioral model. In a preferred embodiment, multi-channels are mined for such behavioral signifiers.

It is well known that certain psychological behavioral models have been developed as tools to evaluate and understand how and/or why one person or a group of people interacts with another person or group of people. The Process Communication Model™ ("PCM") developed by Dr. Taibi Kahler is a preferred example of one such behavioral model. Specifically, PCM presupposes that all people fall primarily into one of six basic personality types: Reactor, Workaholic, Persister, Dreamer, Rebel and Promoter. Although each person is one of these six types, all people have parts of all six types within them arranged like a "six-tier configuration." Each of the six types learns differently, is motivated differently, communicates differently, and has a different sequence of negative behaviors in which they engage when they are in distress. Importantly each PCM personality type responds positively or negatively to communications that include tones or messages commonly associated with another of the PCM personality types. Thus, an understanding of a communicant's PCM personality type offers guidance as to an appropriate responsive tone or message. Exemplary methods of applying a psychological behavioral model to contact center communications are described in U.S. Pat. Nos. 7,995,717 and 8,094,803, and U.S. patent application Ser. No. 13/782,522, filed Mar. 1, 2013, entitled "Customer-Based Interaction Outcome Prediction Methods and System," the entire contents of each of which is incorporated herein in its entirety by express reference thereto.

Figure 3:
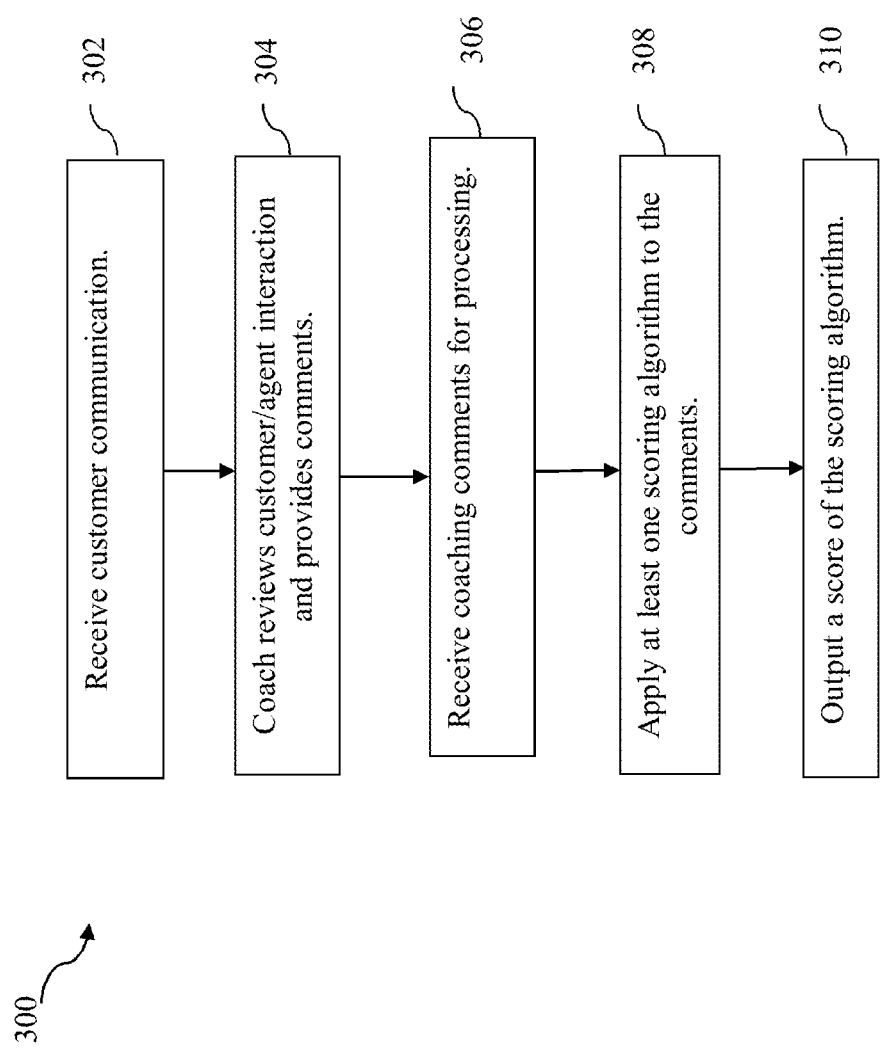
FIG. 3 is a flowchart illustrating a preferred method of analyzing coaching comments according to aspects of the present disclosure.

An exemplary method 300 of analyzing coaching comments will now be described with respect to FIG. 3. At step 302, a customer communication or task is received at contact center 100. Again in FIG. 3, the contact center 100 in one embodiment may be replaced by, or be associated with, an analytics center 120. The communication type may include voice calls, voice over IP, facsimiles, emails, web page submissions, internet chat sessions, wireless messages (e.g., text messages such as SMS (short messaging system) messages or paper messages), short message service (SMS), multimedia message service (MMS), or social media (e.g., Facebook identifier, Twitter identifier, etc.), IVR telephone sessions, voicemail messages (including emailed voice attachments), or any combination thereof.

At step 304, the recorded, near real-time, or real-time interactions are reviewed by contact center coaches who are tasked with providing feedback to agents to improve their performance, and the coach provides comments related to one or more aspects of agent performance. In some embodiments, a coach evaluates a transaction between an agent and a customer by replaying or reviewing a stored representation of the transaction, or a portion thereof based on pre-selected criteria. In one embodiment, the evaluation proceeds with the coach replaying a stored representation of a telephone call. In another embodiment, the evaluation proceeds when the coach reviews an email exchange between an agent and a customer. In other embodiments, the interaction can consist of a combination telephone call and email exchange between the agent and the customer or the interaction can be embodied in other formats.

In some embodiments, the customer/agent interactions are distributed to coaches in real-time or near real-time to provide immediate monitoring by the coaches. Near real-time, high frequency interaction analysis, coupled with near real-time or real time comments by the coach based on this analysis, provides the agent with nearly immediate feedback on his or her performance during the customer contact. Such feedback to an agent enhances learning and can decrease learning curve time, increase performance as measured by various criteria discussed herein, or both, particularly when such coaching comments are provided shortly after the customer contact occurs. The prompt feedback can be provided to the agent through any combination of audio, video, and text, or even in person through post-contact desk-side visit by a coach or by the agent to the coach.

The coach may review certain aspects of the agent's performance including, but not limited to: agent effectiveness (e.g., X % of customers serviced by agent have a favorable outcome for the customer and/or contact center), revenue generating proficiency (e.g., $Y generated by the agent per serviced customer), customer satisfaction level (e.g., Z % of customers serviced by agent received at least a satisfactory customer satisfaction level rating), speed (e.g., average customer service time for agent is W minutes/contact, U % of customers are serviced within V minutes), efficiency (e.g., T % of customers serviced by agent are one-and-done), experience (e.g., number of months/years agent has serviced customers), cross-sell ability (e.g., S % of customers serviced by agent result in additional revenue due to cross-selling), personal satisfaction (e.g., the agent most prefers serving work items of skill X rather than work items of skill Y), proficiency at closing a transaction, and occupancy (e.g., select the agent who has worked less over a specified period to service a work item), or the like, or any combination thereof.

In various embodiments, the coach reviews and evaluates one or more agent/customer interactions to ensure that the agents have met quality of service criteria established for a particular business. This review can occur over a selected period of time, over a pre-set period of time, for segments of time over multiple periods of time (e.g., the first call every hour, or from 2:30-3:30 p.m. each day, or Friday, etc.) for a given agent or for agent interactions with a specific customer including the most recent interaction between that agent and that customer. In one embodiment, the evaluation process includes review of the areas of core skills, soft skills, selling skills, and specific know how. The coaches may check core skills by analyzing, for example, the agent's method and competence in answering the phone and greeting the customer; getting the order in the system; answering basic questions; and comprehension of a request made via email. Some reporting metrics used for report generation include the average call handle time and spelling and grammar used accurately during the interaction with the customer. Soft skills are checked by analyzing whether the agent's greetings are scripted; determining how "canned" the email responses are; determining whether the agent can handle an irate customer under pressure; and analyzing the agent's knowledge of when to engage the agent's supervisor to resolve the call without relying too heavily on the supervisor. In this context, it should be understood that the coach providing the comment on an interaction may be the same or different as the supervisor to whom a particular contact may have been referred by the agent. Some reporting metrics used for report generation for soft skills include whether the customer's issue was resolved with the first call, how many repeat emails were required to resolve the customer's issue, etc. Analyzing selling skills involves ranking the agent's ability to recommend additional products (cross-sell); sell more of the product under discussion by successfully understanding the tone and intonation of the customer during the interaction; and comprehension of the products and services; and the like, and any combination thereof. Some reporting metrics used in report generation for selling skills include measurements of the agent's up-sell and cross-sell performance. Other criteria are employed as are appropriate for a particular industry, product, or evaluation.

An evaluation typically consists of reviewing a customer/agent interaction, or series of interactions between that customer and agent, and breaking each interaction down into categories such as "call opening," "customer service skills," "call closing," "knowledge, accuracy and resolution," "call management," and "sales." For example, "call opening" examines the degree to which the agent used the proper greeting. In the evaluation, the coach is generally also prompted to provide comments and tips regarding one or more elements in the interaction where the agents performed well and elements where the agents could perform even better. The coaching comments generally include suggestions explaining how the agent might achieve the better performance. It should be understood that a "better performance" may be subjective depending on the coach and/or the preferred criteria of a given contact center.

At step 306, the coaching comment is received by the contact center 100 and/or analytics center 120 for processing. The coaching comments may be received in any form of electronic communication, including text based (email, text, web interaction) or recorded verbal (telephonic) comments or video based comments. In various embodiments, the non-text comments are converted to text before processing.

The coaching comments may be presented to the agent in person, for example, during an in-person meeting with the agent. During such a coaching meeting, potential deficiencies in an agent's skill set can be identified, thereby leading to the assignment of various learning or training exercises or performance goals. Goals also can be assigned during a coaching meeting with any assigned learning and goals being annotated on a coaching form. In some embodiments, an agent can be given an opportunity to provide feedback on the coaching session using the coaching form. In some embodiments, a coaching session is considered complete when the corresponding coaching form is annotated as such by the relevant coach. In some embodiments, however, the coaching session may not be deemed complete until further analysis is undertaken in order to determine whether the coaching session has resulted in one or more improvements in agent performance.

At step 308, at least one scoring algorithm is applied to each comment made by the coach. The scoring algorithm looks for: (1) specific terms and phrases that indicate the characteristic or property desired (e.g., customization, action ability, and/or encouragement), (2) the density of those terms in the overall comment; and (3) the presence of those terms in the first sentence of the comment. In certain embodiments, terms and phrases that are present in the first sentence are given heavier weight than those in the rest of the comment.

In various embodiments, these terms, phrases, or keywords are stored in a library or libraries that are accessed by the control system 142 or the analytics system 160. The library may separate the keywords, terms, and phrases into different categories. Keywords are the words previously determined to indicate the specific characteristic of the coaching comment. Each keyword may have respective aliases, which are essentially synonyms of keywords. Synonyms of the keywords may be identified and also stored in the library. The aliases are typically treated as interchangeable with the keywords from a scoring perspective, but in one embodiment aliases can be treated as not interchangeable if specific words, terms, or phrases are expected to be used. Also, due to the flexibility of the methods described herein, additional words, terms, and/or phrases may be added to the library at any time. For example, when it becomes apparent that another word is used frequently and is just as effective as the associated keyword, the library may be updated to include this word as an acceptable alias.

A scoring algorithm is configured to detect keywords, terms, and phrases in the statements of the coach to the agent and the comments are scored based on the number of word hits in this embodiment. In one embodiment, the scoring algorithm includes a "customized" algorithm that looks for words that identify the specific impact that a change in behavior will have on future customer interactions and the agent's metrics. For instance, the phrases "resulting in," "help to increase," "goal is to," "saved a couple of seconds of talk time," "to decrease call length," "consequently," "as might be expected," "due to," "leads to," "brought about," "was responsible for," "to increase efficiency," "we want to decrease/increase," and "could have increased/decreased/produced/improved/saved/minimized" indicate the property of customization. In another embodiment, the scoring algorithm includes an "actionable" algorithm that looks for words that identify behavior that needs to be improved and language that is clearly indicative of what the agent needs to do next time. The "actionable" algorithm also evaluates the proximity of action words to other action words. The more action words used, the closer they are together, and the more clearly indicated the next course of action is, the higher the comment scores with the algorithm. Examples of "actionable" terms include "in the future," "make sure to," "need to work on," "remember to," and "an opportunity to." In yet another embodiment, the scoring algorithm includes an "encouragement" algorithm that looks for words that identify positive language that reinforces good behavior. Exemplary words, terms, and phrases that the algorithm searches for include "appreciate," "thanks," "thank you," "good/great/wonderful job," and "keep up the good work."

A scoring algorithm(s) is typically created by linguistic analysts and are typically trained using previously analyzed coaching comments. Each algorithm is trained with known inputs and learns these patterns through one or more statistical methods. The algorithms can then properly classify new input based on the inputs it has received and processed during training. The algorithm should be able to perform accurately on new, unseen examples after having trained on a learning data set. The larger the comparable data set, the higher the accuracy the algorithm is likely to achieve. In various embodiments, the algorithms are calibrated, customized, and updated according to different coaching styles.

At step 310, a score of the scoring algorithm is output. The score can be assigned using any suitable grading scale such as a numeric scale, an alphabetical scale or other scale created to rank the coach's performance. In one embodiment, a numeric scale can be used having a range of values from 1 to 10, where 1 indicates a minimum score and 10 indicates a maximum score. Other ranges can be used, such as 1 to 5 or 1 to 100, or A to C or A to F, or a combination of a numerical and letter scale to indicate different characteristics or weighting to different characteristics (e.g., an A2 is twice the importance of a lower score D1); no limitation is implied by the ranges given in this description. The scoring can also be binary, i.e., according to a two state yes/no score rather than a score that comprises more than two states. The score can be compared to the score of other coaches, or to a benchmark or target score to determine whether the coach needs to improve his or her performance.

In certain embodiments, each comment of the coach is scored and aggregated into an overall score for the coach. The scores can be aggregated for a predefined period (e.g., 6 months, one year, etc.) to trace the coach's performance over time. The aggregated score for each coach can then be compared to the scores for other coaches at the same or different contact centers for a given time period. In one embodiment, a coach's score is compared against target scores, and these targets can be adjusted depending on the desired performance. The scores can be provided to the coach and used as a training aid to improve the feedback provided to an agent. The aggregated coach score for one period can also be directly compared to an aggregated score for the same coach over a different period of time, for a specific agent or a plurality of agents.

Figure 4:
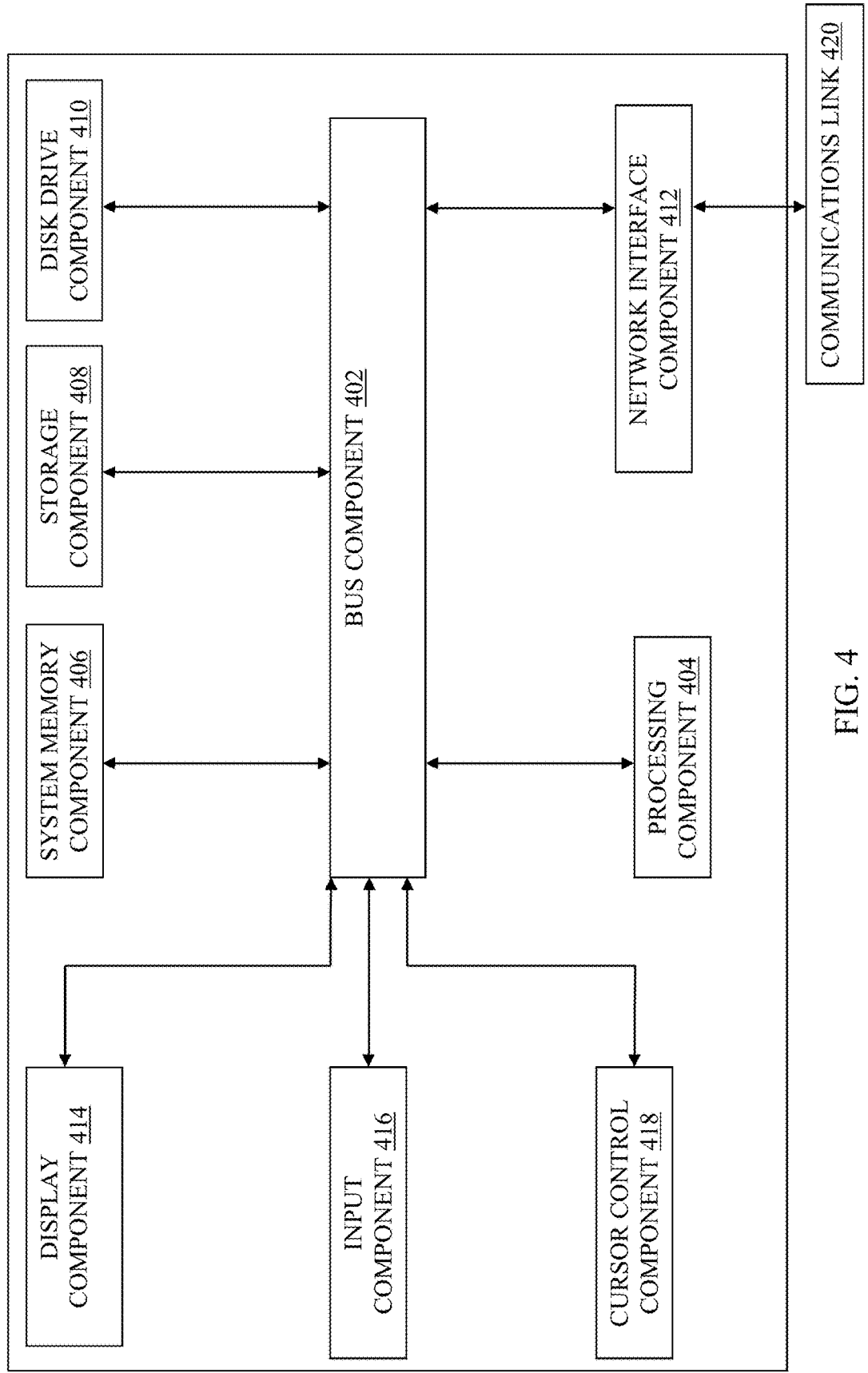
FIG. 4 is a block diagram of a computer system suitable for implementing one or more components in FIG. 2 according to one embodiment of the present disclosure.

Referring now to FIG. 4, illustrated is a block diagram of a system 400 suitable for implementing embodiments of the present disclosure, including control system 142 and the analytics system 160 depicted in FIG. 2. System 400, such as part a computer and/or a network server, includes a bus 402 or other communication mechanism for communicating information, which interconnects subsystems and components, including one or more of a processing component 404 (e.g., processor, micro-controller, digital signal processor (DSP), etc.), a system memory component 406 (e.g., RAM), a static storage component 408 (e.g., ROM), a network interface component 412, a display component 414 (or alternatively, an interface to an external display), an input component 416 (e.g., keypad or keyboard), and a cursor control component 418 (e.g., a mouse pad).

In accordance with embodiments of the present disclosure, system 400 performs specific operations by processor 404 executing one or more sequences of one or more instructions contained in system memory component 406. Such instructions may be read into system memory component 406 from another computer readable medium, such as static storage component 408. These may include instructions to apply a scoring algorithm to a coaching comment, output the score of the scoring algorithm, etc. It should be understood that different scoring algorithms may be used, or the same algorithm set to weight different criteria differently. Should multiple scores result from use of multiple algorithms, for example, these can be averaged, or normalized based on weighting, or the like, to result in a single score if desired. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 404 for execution. Such a medium may take many forms, including but not limited to, non-volatile media, volatile media, and transmission media. In various implementations, volatile media includes dynamic memory, such as system memory component 406, and transmission media includes coaxial cables, copper wire, and fiber optics, including wires that comprise bus 402. Memory may be used to store visual representations of the different options for searching or auto-synchronizing. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 400. In various other embodiments, a plurality of systems 400 coupled by communication link 420 (e.g., networks 102 or 104 of FIG. 1, LAN, WLAN, PTSN, or various other wired or wireless networks) may perform instruction sequences to practice the disclosure in coordination with one another. Computer system 400 may transmit and receive messages, data, information and instructions, including one or more programs (i.e., application code) through communication link 420 and communication interface 412. Received program code may be executed by processor 404 as received and/or stored in disk drive component 410 or some other non-volatile storage component for execution.

In view of the present disclosure, it will be appreciated that various methods, apparatuses, and systems have been described according to one or more embodiments for routing incoming customer communications and tasks and recording such interactions with agents, having a coach provide comment(s) regarding such interaction(s), and then evaluating and scoring such coaching comment(s) from the coach.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable media. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow a quick determination of the nature of the technical disclosure. It is submitted with the understanding that it will not be used to interpret or limit the scope or meaning of the claims.

What is claimed is:

1. A system for analyzing coaching comments by a coach, comprising:
    a node comprising a processor and a computer readable medium operably coupled thereto, the computer readable medium comprising a plurality of instructions stored in association therewith that are accessible to, and executable by, the processor, where the plurality of instructions comprises:
        instructions, that when executed, receive and record a first interaction between an agent and a customer, wherein the first interaction comprises a non-text interaction;
        instructions, that when executed, receive and record a coaching comment from the coach regarding the agent's interaction with the customer, wherein the coach is a different person than the agent and the customer, the coaching comment comprises a suggestion on how the agent can improve agent performance, and the coaching comment comprises a non-text comment;
        instructions, that when executed, convert the first interaction and the coaching comment into text;
        instructions, that when executed, access a database storing keywords that identify agent behavior that needs improvement;
        instructions, that when executed, review the converted text of the first interaction and the coaching comment for the presence of the keywords from the database;
        instructions, that when executed, apply a linguistic algorithm to the text to score the text of the coaching comment based on the presence of the keywords in the coaching comment;
        instructions, that when executed, determine performance of the coach based on the score of the coaching comment; and
        instructions, that when executed, display the score of the coaching comment on a user device to improve the performance of the coach.

2. The system of claim 1, wherein the score is binary or scalar.

3. The system of claim 1, which further comprises instructions, that when executed, review the coaching comment for encouragement, likelihood to change the agent's behavior, or a combination thereof, to provide a further basis for the score.

4. The system of claim 3, wherein the instructions that review the coaching comment comprise instructions, that when executed, search for: pre-selected terms or phrases that indicate actionability, or encouragement; density of the pre-selected terms or phrases in the coaching comment; presence of the pre-selected terms or phrases in a first sentence of the coaching comment; or a combination thereof.

5. The system of claim 1, further comprising instructions, that when executed, combine the coach's scores for a plurality of coaching comments into an aggregated score.

6. The system of claim 5, wherein the coach's scores are combined over a period of time.

7. The system of claim 5, further comprising instructions, that when executed, compare the aggregated score to an aggregated score of one or more other coaches.

8. The system of claim 1, further comprising instructions, that when executed, receive and analyze the agent's interaction with the customer to facilitate scoring the coaching comment.

9. The system of claim 1, further comprising:
    instructions, that when executed, determine a target score for the coaching comment;
    instructions, that when executed, compare the score of the coaching comment to the target score; and
    instructions, that when executed, determine whether the coach needs to improve the performance based on the comparison.

10. The system of claim 1, wherein applying a linguistic algorithm to the text to score the text of the coaching comment comprises determining a number of the keywords in the coaching comment, proximity of the keywords to each other in the coaching comment, or both.

11. A method for analyzing coaching comments by a coach, which comprises:
    receiving and recording, by a processor, a first interaction between an agent and a customer, wherein the first interaction comprises a non-text interaction;
    receiving and recording, by the processor, a coaching comment from the coach regarding the agent's interaction with the customer, wherein the coach is a different person than the agent and the customer, the coaching comment comprises a suggestion on how the agent can improve agent performance, and the coaching comment comprises a non-text comment;
    converting, by the processor, the first interaction and the coaching comment into text;
    accessing, by the processor, a database storing keywords that identify agent behavior that needs improvement;
    reviewing, by the processor, the converted text of the first interaction and the coaching comment for the presence of the keywords from the database;

applying, by the processor, at least one linguistic scoring algorithm to the text of the coaching comment to search for the presence of the keywords in the coaching comment;

determining, by the processor, performance of the coach based on the score of the coaching comment; and displaying, by the processor, the score of the coaching comment on a user device to improve the performance of the coach.

12. The method of claim 11, wherein the score is binary or scalar.

13. The method of claim 11, wherein the at least one linguistic scoring algorithm analyzes the coaching comment for encouragement, likelihood to change the agent's behavior, or a combination thereof to provide a further basis for the score.

14. The method of claim 13, wherein the at least one linguistic scoring algorithm further searches for: pre-selected terms or phrases that indicate actionability, or encouragement; density of the pre-selected terms or phrases in the comment; presence of the pre-selected terms or phrases in a first sentence of the coaching comment; or a combination thereof.

15. The method of claim 11, which further comprises aggregating individual scores of the coach over a period of time.

16. The method of claim 15, which further comprises comparing the aggregated score of the coach with an aggregated score of one or more other coaches.

17. The method of claim 15, which further comprises comparing the aggregated score of the coach to a target score.

18. The method of claim 15, which further comprises receiving and analyzing the agent's interaction with the customer to facilitate application of the linguistic scoring algorithm.

19. A non-transitory computer readable medium comprising a plurality of instructions comprising:
    instructions, that when executed, receive and record a first interaction between an agent and a customer, wherein the first interaction comprises a non-text interaction;
    instructions, that when executed, receive and record a coaching comment from a coach regarding the agent's interaction with the customer, wherein the coach is a different person than the agent and the customer, the coaching comment comprises a suggestion on how the agent can improve agent performance, and the coaching comment comprises a non-text comment;
    instructions, that when executed, convert the first interaction and the coaching comment into text;
    instructions, that when executed, access a database storing keywords that identify agent behavior that needs improvement;
    instructions, that when executed, review the converted text of the first interaction and the coaching comment for the presence of the keywords from the database;
    instructions, that when executed, score the text of the coaching comment using at least one linguistic scoring algorithm to search for the presence of the keywords in the coaching comment;
    instructions, that when executed, determine performance of the coach based on the score of the coaching comment;
    instructions, that when executed, aggregate scores for each coaching comment of the coach;
    instructions, that when executed, compare the aggregated score of the coach to a second aggregated score; and
    instructions, that when executed, display the aggregated score on a user device to improve the performance of the coach.

20. The non-transitory computer readable medium of claim 19, wherein the aggregated score is binary or scalar.

21. The non-transitory computer readable medium of claim 19, wherein the at least one linguistic scoring algorithm analyzes the coaching comment for encouragement, likelihood to change the agent's behavior, or a combination thereof to provide a basis for the score.

22. The non-transitory computer readable medium of claim 21, wherein the at least one linguistic scoring algorithm further searches for: pre-selected terms or phrases that indicate actionability, or encouragement; density of the pre-selected terms or phrases in the coaching comment; presence of the pre-selected terms or phrases in a first sentence of the coaching comment, or a combination thereof.

23. The non-transitory computer readable medium of claim 19, wherein the second aggregated score is an aggregated score of a second coach, an aggregated score of the coach from a different time period, an aggregated score of the coach based on a different agent interaction with a customer, a target score, or a combination thereof.

24. The non-transitory computer readable medium of claim 19, further comprising instructions, that when executed, receive and analyze the agent's interaction with the customer.

25. A method, which comprises:
    receiving and recording a first interaction between an agent and a customer, wherein the first interaction comprises a non-text interaction;
    providing a linguistic algorithm;
    receiving and recording a coaching comment from a coach regarding the agent's interaction with the customer, wherein the coach is a different person than the agent and the customer, the coaching comment comprises a suggestion on how the agent can improve agent performance, and the coaching comment comprises a non-text comment;
    converting the first interaction and the coaching comment into text;
    accessing a database storing keywords that identify agent behavior that needs improvement;
    reviewing the converted text of the first interaction and the coaching comment for the presence of keywords from the database;
    causing the linguistic algorithm to identify the keywords in the text of the coaching comments to determine a score of the coaching comment;
    determining performance of the coach based on the score of the coaching comment; and
    displaying the score of the coaching comment on a user device to improve the performance of the coach.

26. The method of claim 25, which further comprises creating libraries of customized, and encouraging comment terms and phrases.

27. A method for analyzing coaching comments, which comprises:
    receiving and recording a first interaction between an agent and a customer, wherein the first interaction comprises a non-text interaction;
    receiving and recording a coaching comment from an agent supervisor regarding the agent's interaction with the customer, wherein the coach is a different person than the agent and the customer, the coaching comment comprises a suggestion on how the agent can improve agent performance and the coaching comment comprises a non-text comment;
converting the first interaction and the coaching comment into text;
accessing a database storing keywords that identify agent behavior that needs improvement;
reviewing the converted text of the first interaction and the coaching comment for the presence of the keywords from the database;
applying at least one linguistic scoring algorithm to the text of the coaching comment to determine the number of the keywords from the database in the coaching comment and to score the coaching comment;
determining performance of the coach based on the score of the coaching comment; and
displaying the score of the coaching comment on a user device to improve the performance of the coach.

* * * * *